June 6, 1961
A. HASEK
2,986,788
CHAIN LINK COUPLER
Filed April 22, 1960
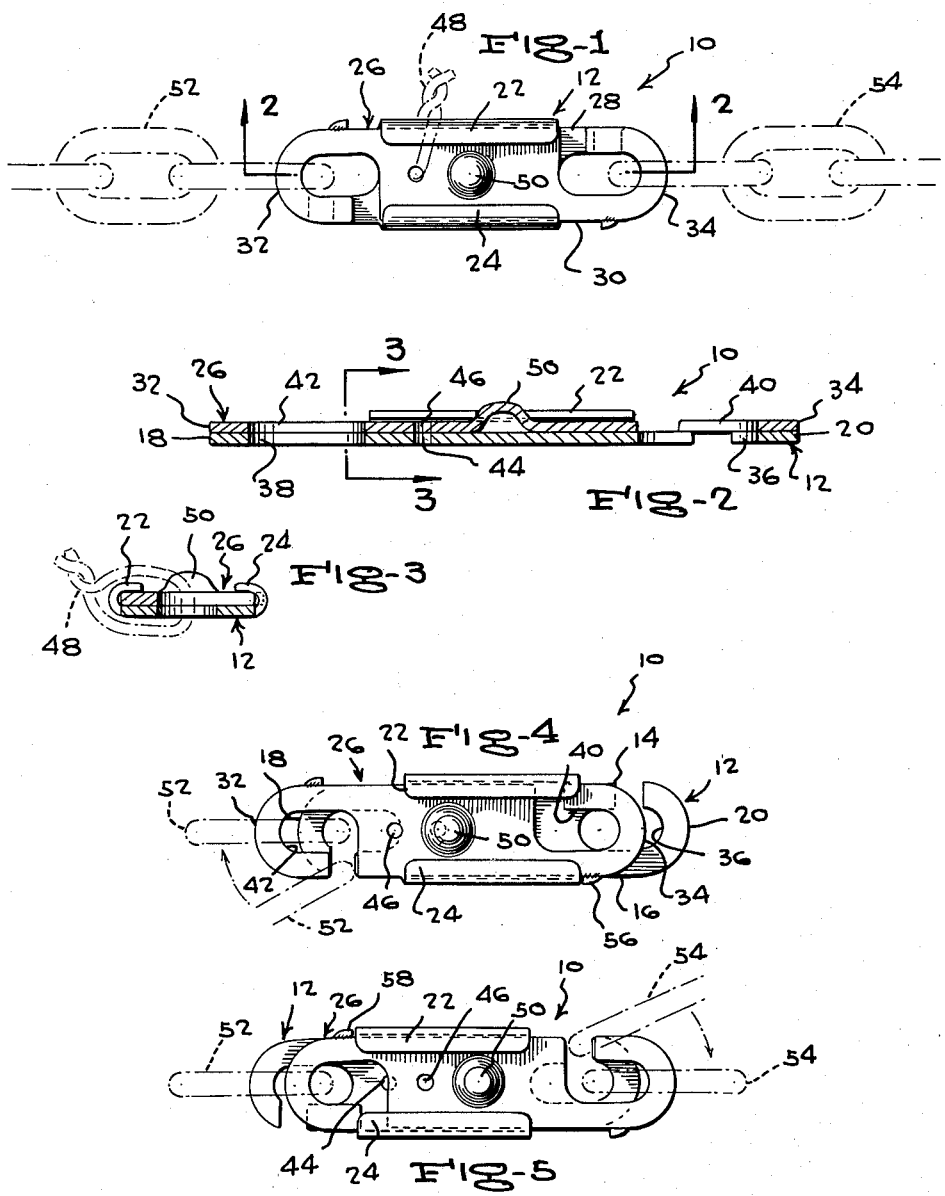
INVENTOR.
ANTHONY HASEK
BY
McMorrow, Berman & Davidson
ATTORNEYS

United States Patent Office 2,986,788
Patented June 6, 1961

2,986,788
CHAIN LINK COUPLER
Anthony Hasek, Rte. 2, Box 506, Brownsville, Pa.
Filed Apr. 22, 1960, Ser. No. 24,129
4 Claims. (Cl. 24—73)

The present invention relates to a coupler for securing together links of a chain.

Previously proposed and presently in use are couplers for chain links for securing free ends of a chain together either as an emergency measure or as a permanent link. Not all of the couplers or links have been successful for many reasons. A principal defect of the links proposed is that the link is weak in one or more places and disarrangement and distortion of the link occurs when the link is put under tensile force. Another defect in the links proposed resides in the fact that when the links are distorted as a result of an excessive pulling force applied thereto, the links are distorted so that they cannot be disconnected from the chain free ends.

An object of the present invention is to provide a chain link coupler which is sturdy in construction, one which is not ordinarily distorted or elongated when a tensile force is applied thereto, one which lends itself to attachment to the free ends of a chain with ease and facility, and one which is highly effective in action.

Another object of the present invention is to provide a chain link coupler which can be manufactured in quantity at reasonable cost, one having means for securing the component parts together against inadvertent movement, and one which may be manufactured and assembled by relatively unskilled labor and without the need of special tools.

These and other objects and advantages of the present invention will become fully apparent from the following description when taken in conjunction with the annexed drawing, in which:

FIGURE 1 is a top plan view of the chain link coupler of the present invention, the dotted line showing indicating the free ends of two links of chain, also showing a twist of wire securing the component parts of the coupler together;

FIGURE 2 is a view taken on the line 2—2 of FIGURE 1, and on an enlarged scale;

FIGURE 3 is a view taken on the line 3—3 of FIGURE 2, the dotted line showing indicating a twist of wire holding the parts together;

FIGURE 4 is a plan view showing one of the components slid lengthwise of the other component to admit thereto the free end of a chain, at one end; and FIGURE 5 is a view similar to FIGURE 4, showing one of the components slid in the opposite direction to admit the free end of another chain, the chain being shown in dotted lines.

Referring to the drawing in detail, in which like numerals indicate like parts throughout the several views, the chain link coupler according to the present invention is designated generally by the reference numeral 10 and it comprises a flat elongated holder member 12 having spaced side edges 14 and 16 and an end edge 18 and 20 extending between adjacent ends of the side edges 14 and 16.

Each of the side edges 14 and 16 of the member 12 has an upwardly and inwardly turned flange, 22 and 24, forming a slideway for a flat locking element 26 slidably mounted therein for movement in opposite derections.

The locking element 26 has spaced side edges 28 and 30 and end edges extending between adjacent ends of the side edges 28 and 30, the end edges being designated by the numerals 32 and 34 and shown most clearly in FIGURE 2.

The holder member 12 has a slot 36 inwardly of one end and another slot 38 inwardly of the other end, the slots 36 and 38 opening out of the side edges 14 and 16, respectively.

The locking element 26 is provided with slots 40 and 42 inwardly of each end, the slots 40 and 42 opening out of the locking element side edges 28 and 30, respectively.

Complemental means embodying aligned apertures 44 and 46 are provided in the holder member 12 and locking element 26, respectively, for the reception therethrough of a fastening element such as a twist of wire, as shown in dotted lines in FIGURES 1 and 3, and designated by the reference numeral 48.

The upper face of the locking element 26 has intermediate the ends thereof an upwardly struck abutment 50 forming a means by which the locking element 26 may be slid from one end to the other end of the longitudinally extending slideway formed by the flanges 22 and 24.

In use, the free end links of chains 52 and 54, shown in dotted lines in FIGURES 1, 4, and 5, may be secured together by the coupler 10. In order to connect the coupler 10 to the chains 52 and 54, first the locking element 26 is slid in one direction, to the left in FIGURE 4, bringing the opening in the locking element side edge 30 into registry with the opening into the slot 38 in the holder member side edge 16.

When the locking element 26 has been slide to the left, as in FIGURE 4, a stop 56 on the locking element 26 engages one end of the flange 24 and prevents further sliding movement of the locking element 26 relative to the holder member 12. In this position, the end link on the chain 52 may be inserted, as shown in dotted lines in FIGURE 4, through the aligned openings and into the aligned slots 38 and 42.

Next, the locking element 26 is slid in the opposite direction on the holder member 12 to the limit of its movement as permitted by another stop 58 engaging the adjacent end of the flange 22. The stop 58 projects from the locking element 26. With the locking element 26 slid to the right as in FIGURE 5, the opening in the holder member side edge 14 is brought into registry with the opening in the side edge 28 of the locking element 26. The free end of the chain 54 may now be linked into the slots 36 and 40. After this, the locking element 26 is returned to its normal position on the holder member 12 so that the apertures 44 and 46 are in registry and a twist of wire as at 48 may be inserted therethrough and wound upon itself to secure the locking element 26 and holder member 12 against movement relative to each other.

What is claimed is:

1. A chain link coupler comprising a flat elongated holder member including spaced side edges and an end edge extending between adjacent ends of said side edges, said holder member being provided with a slot opening through a side edge adjacent each end edge thereof, a longitudinally extending slideway on one face of said holder member, and a flat locking element slidably mounted in said slideway for movement in opposite directions, said locking element having spaced side edges and an end edge extending between adjacent ends of the side edge of said locking element, there being a slot in said locking element inwardly of each end and opening out of a side edge thereof, said locking element upon execution of movement in one direction bringing the opening in said locking element side edge adjacent one end into registry with the adjacent opening in said holder member side edge and upon execution of movement in the other direction bringing the opening in said locking element side edge adjacent the other end into registry with the adjacent opening in said holder member side edge.

2. A chain link coupler comprising a flat elongated holder member including spaced side edges and an end edge extending between adjacent ends of said side edges, said holder member being provided with a slot opening through a side edge adjacent each end edge thereof, a longitudinally extending slideway on one face of said holder member, and a flat locking element slidably mounted in said slideway for movement in opposite directions, said locking element having spaced side edges and an end edge extending between adjacent ends of the side edge of said locking element, there being a slot in said locking element inwardly of one end and opening out of one side edge thereof and another slot inwardly of the other end and opening out of the other side edge thereof, said locking element upon execution of movement in one direction bringing the opening in said locking element side edge adjacent one end into registry with the adjacent opening in said holder member side edge and upon execution of movement in the other direction bringing the opening in said locking element side edge adjacent the other end into registry with the adjacent opening in said holder member side edge.

3. A chain link coupler comprising a flat elongated holder member including spaced side edges and an end edge extending between adjacent ends of said side edges, said holder member being provided with a slot opening through a side edge adjacent each end edge thereof, a longitudinally extending slideway on one face of said holder member, a flat locking element slidably mounted in said slideway for movement in opposite directions, said locking element having spaced side edges and an end edge extending between adjacent ends of the side edge of said locking element, there being a slot in said locking element inwardly of each end and opening out of a side edge thereof, said locking element upon execution of movement in one direction bringing the opening in said locking element side edge adjacent one end into registry with the adjacent opening in said holder member side edge and upon execution of movement in the other direction bringing the opening in said locking element side edge adjacent the other end into registry with the adjacent opening in said holder member side edge, and complemental means on said holder member and said locking element for the reception of a fastening means for holding said member and element against relative movement.

4. A chain link coupler comprising a flat elongated holder member including spaced side edges and an end edge extending between adjacent ends of said side edges, said holder member being provided with a slot opening through a side edge adjacent each end edge thereof, a longitudinally extending slideway on one face of said holder member, a flat locking element slidably mounted in said slideway for movement in opposite directions, said locking element having spaced side edges and an end edge extending between adjacent ends of the side edge of said locking element, there being a slot in said locking element inwardly of one end and opening out of one side edge thereof and another slot inwardly of the other end and opening out of the other side edge thereof, said locking element upon execution of movement in one direction bringing the opening in said locking element side edge adjacent one end into registry with the adjacent opening in said holder member side edge and upon execution of movement in the other direction bringing the opening in said locking element side edge adjacent the other end into registry with the adjacent opening in said holder member side edge, and complemental means embodying aligned apertures on said holder member and said locking element for the reception of a fastening means for holding said member and element against relative movement.

References Cited in the file of this patent
UNITED STATES PATENTS

| | | |
|---|---|---|
| 505,281 | Smith | Sept. 19, 1893 |
| 1,719,662 | Jones | July 2, 1929 |
| 2,457,435 | Beckman | Dec. 28, 1948 |